United States Patent [19]
Schroeder

[11] Patent Number: 5,653,879
[45] Date of Patent: Aug. 5, 1997

[54] LIQUID AND SOLID SEPARATOR

[76] Inventor: Vern Schroeder, 3067 350th St., Lake View, Iowa 51450

[21] Appl. No.: 602,897

[22] Filed: Feb. 16, 1996

[51] Int. Cl.$^6$ .............................. B01D 21/26; B30B 9/12
[52] U.S. Cl. .................... 210/298; 210/360.1; 210/365; 210/374; 100/117
[58] Field of Search .......................... 210/512.1, 298, 210/360.1, 365, 374; 100/117

[56] References Cited

U.S. PATENT DOCUMENTS

| | | |
|---|---|---|
| 604,348 | 5/1898 | Bussells . |
| 3,398,676 | 8/1968 | Theobald et al. . |
| 3,444,077 | 5/1969 | Finch ................... 210/512.1 |
| 3,450,034 | 6/1969 | Ocker . |
| 3,756,434 | 9/1973 | Teske . |
| 3,966,607 | 6/1976 | Gaynor et al. . |
| 4,214,377 | 7/1980 | Maffet . |
| 4,271,754 | 6/1981 | Homann ................... 100/117 |
| 4,279,556 | 7/1981 | Ronning . |
| 4,304,054 | 12/1981 | Nauck ................... 100/117 |
| 4,323,007 | 4/1982 | Hunt et al. . |
| 4,412,485 | 11/1983 | Brown . |
| 4,587,896 | 5/1986 | Steinke . |
| 4,615,647 | 10/1986 | Lukacz . |
| 5,185,087 | 2/1993 | Lister . |
| 5,337,658 | 8/1994 | Bruke . |

*Primary Examiner*—David A. Reifsnyder
*Attorney, Agent, or Firm*—Zarley, McKee, Thomte, Voorhees, & Sease

[57] ABSTRACT

A flattened end portion of flighting is added to the conventional auger flighting at the output end of an auger separator. A plug zone is created in the inner perforated tube between the flattened flighting and pressure end gates, which normally close the inner tube. The auger shaft extends beyond the flattened flighting to the end of the inner tube, forming a stub shaft which centers the auger in the inner tube when the plug zone is filled with material around the stub shaft. The material functions as a bearing to center the auger shaft. The material in the plug zone is pressed against the perforated inner tube, causing the bonded water to be removed. The flattened end portion flighting extends circumferentially approximately 70° to 80° around the auger shaft, adding an axial length of approximately ¼ to ⅜ inch.

21 Claims, 4 Drawing Sheets

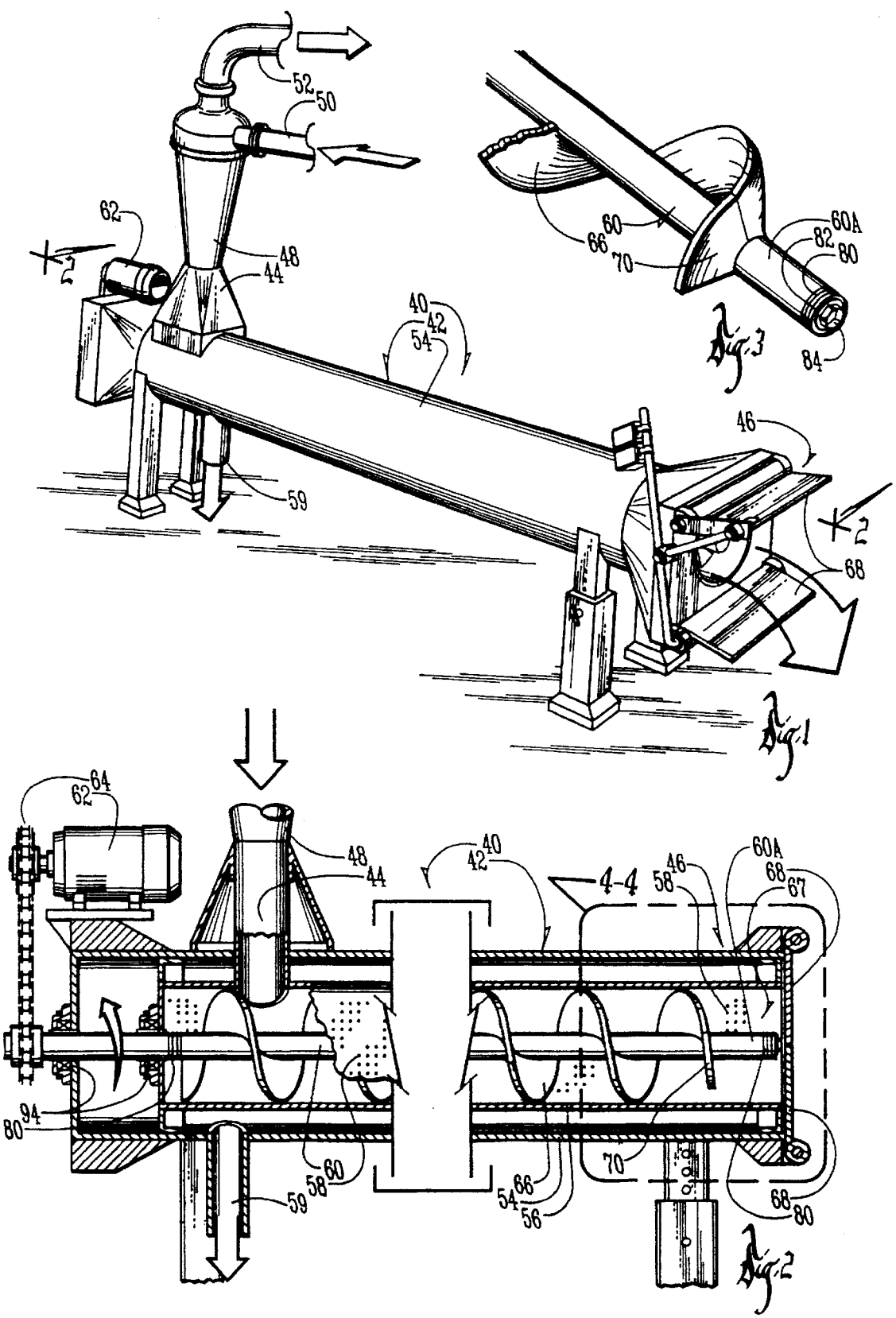

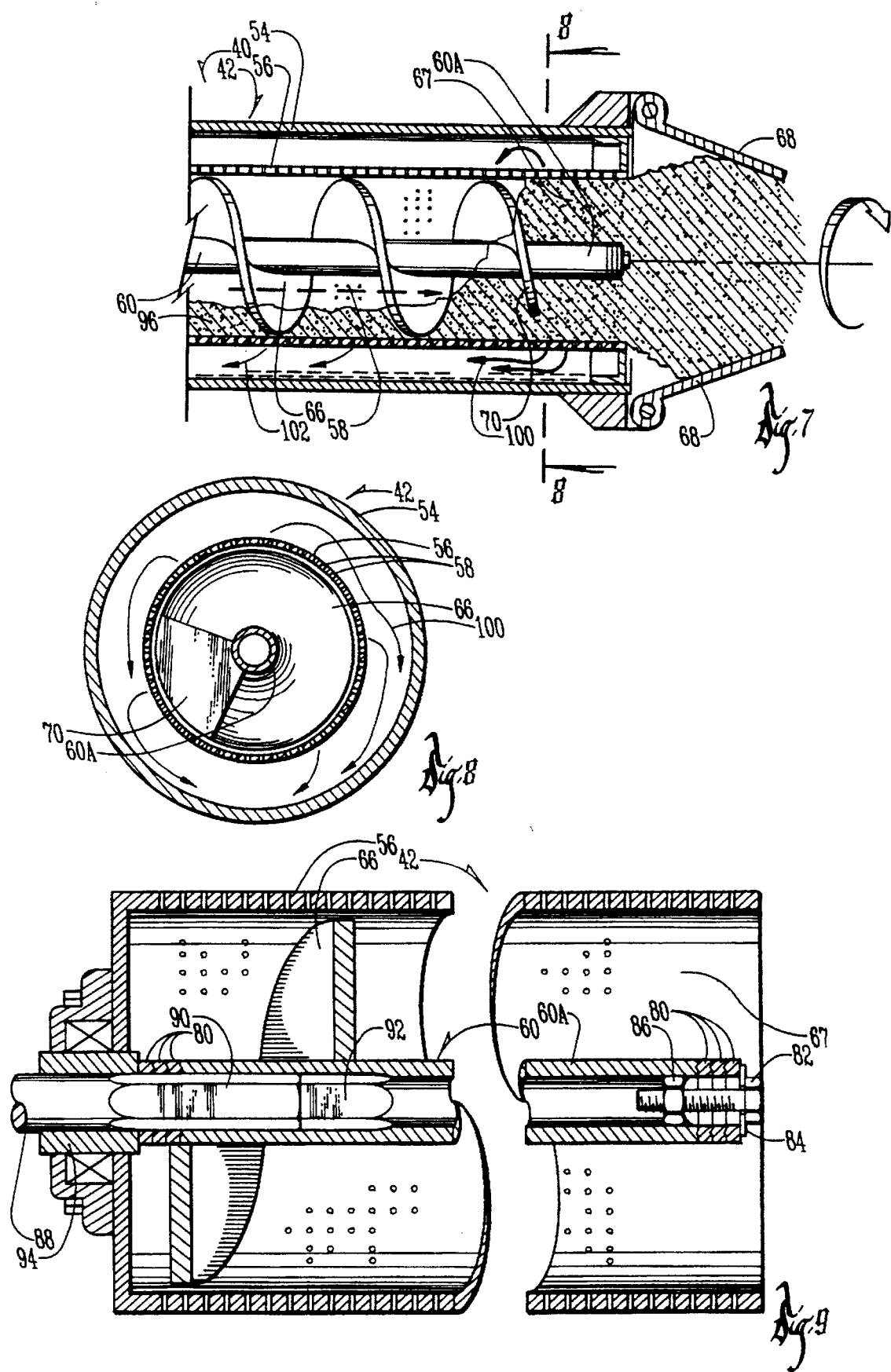

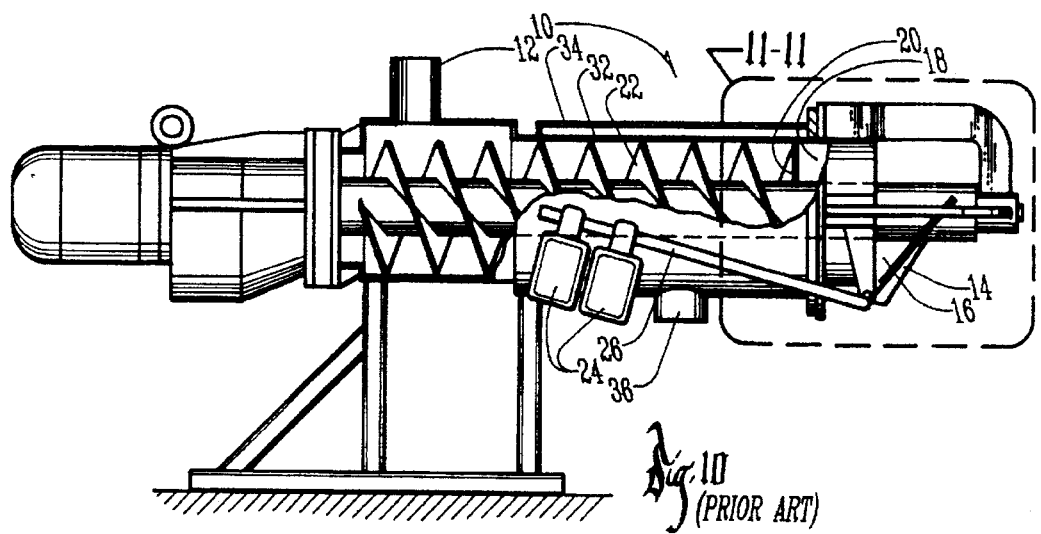
Fig. 10 (PRIOR ART)
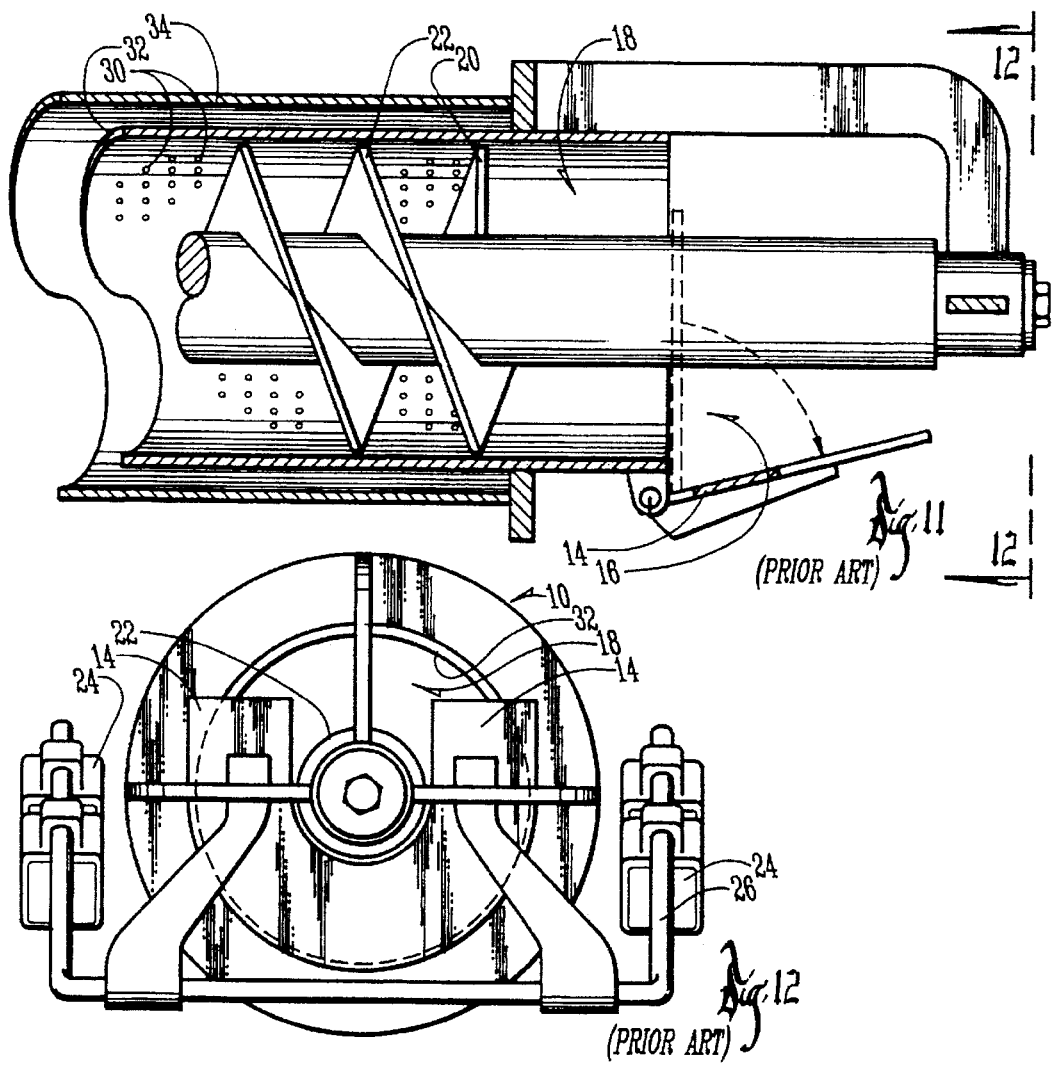
Fig. 11 (PRIOR ART)
Fig. 12 (PRIOR ART)

LIQUID AND SOLID SEPARATOR

BACKGROUND OF THE INVENTION

The disposing of liquid manure from cattle, pig and poultry farm operations has been a problem for many years. The disposal of these products must be consistent with prevailing environmental standards. It is recognized that separating fresh solids before their polutive elements dissolve in the liquid is important. Thus, an objective of today's manure handling system is to remove the fresh solids from the liquid manure slurries to reduce the pollutant and nutrient content of the manure, thereby prolonging the life of a manure lagoon and other storage facilities and improving the effectiveness of biological treatments, and minimizing the risk of creating an environmental nuisance.

Solids separated from the liquid manure may be spread on farm land; used as bedding materials; or may be mixed with feed ingredients to produce rations for ruminant animals. The solids may also be granulated and bagged and sold as commercial compost.

Typical of the equipment used today to separate solids from liquids in manure is a screw press separator, as illustrated in FIGS. 8 and 9. Such equipment is available from Fan Engineering, U.S.A., Inc., Columbus, Ohio.

In the prior art auger separator 10 shown in FIGS. 8-12, material is fed into the auger through an inlet 12 and discharged through a pressure gate 14 at the outlet end 16. A plug zone 18 exists between the outer end 20 of flighting 22 and the pressure gate 14. Weights 24 on an arm 26 allow for the pressure required to open the gates 14 to be varied.

The flighting 22 has a uniform pitch from the inlet end to the end 20, and depends on pressure build-up against the pressure plates 14 to cause liquid to be separated from solid material by being forced through openings 30 in an inner auger tube 32. The liquid is collected in an outer tube 34 and drained from the auger separator 10 through an outlet conduit 36.

The problem with the prior art auger separator of FIGS. 8 and 9 is that insufficient liquid can be separated from the solid material. The pressure required to open the pressure gates 14 can only be set so high, and beyond that critical point the system will shut down and become inoperative. As noted, insufficient pressure can be applied to the slurry material to separate out a high enough percentage of liquid before the entire system is shut down. It is thus apparent that what is needed is an improvement to the auger separator system that allows for a higher percentage of liquid separation from the solids.

SUMMARY OF THE INVENTION

The liquid and solid separator of this invention is an improvement on the prior art system disclosed in FIGS. 10-12. The auger of this invention has a minimum length of four feet to maximize removal of "free" water from the solid material as that material moves from the inlet end of the auger to the outlet end of the auger. The auger normally will be partially full along its length and does not depend on pressure within the auger flighting for removal of moisture. The flighting on the auger has a uniform pitch from the inlet end to the discharge end but then what may be regarded as a flattened flighting portion is added which has a minimal pitch compared to the pitch of the primary flighting. The flattened end portion flighting extends partially around the auger shaft and less than fifty percent (180°) of the circumference. Preferably the flighting extends 70° to 80°.

The space in the auger between the flattened flighting and the end of the auger tubing constitutes a plug zone in which the bonded water is squeezed out of the solid material due to the pressure build-up in the plug zone. The solid material is compressed against the perforated tubing sidewall and the flattened auger flighting.

The distance between the end of the conventional flighting and the end of the auger tube can be varied according to the material being processed, as this distance is a major determining factor as to how much bonded water is compressed out of the solid material. As an example, the conventional auger flighting could have a pitch of nine and one-half inches and the distance between the end of the flighting and the end of the auger tube would vary from six to nine inches, with eight inches often being an appropriate distance.

The auger includes a stub shaft extending from the end of the flighting to the end of the auger tube, which is important as it functions as a bearing when operating within the plug zone of solid material, thereby preventing the flighting from damaging the auger tubing. The plug zone length variation of three inches is possible through the use of spacers which are transferable from the inlet end of the auger to the outlet end, such that the stub shaft length is varied up to three inches, which in turn varies the length of the plug zone while always having the stub shaft terminate at the end of the auger tubing to assure that auger support is provided throughout the full length of the plug zone in the auger tube.

Testing of the moisture at the output of the prior art auger of FIGS. 10-12 indicates that in hog manure having moisture between 90% to 95%, the moisture is reduced to 75% to 80%. In the present invention, hog manure with 90% to 95% moisture is reduced at the outlet end to 57% to 60%. It is believed that between the free water removed along the length of the auger and the bonded water removed in the plug zone, 80% to 85% of the water is removed in the plug zone.

The speed of auger rotation is preferably on the order of 58 to 60 rpm for hog manure. If the auger is rotated faster, less moisture will be removed, and if slower, heat will be produced as the result of excessive pressure in the plug zone being generated which may cause possible damage to the screen tube.

While this invention is particularly suited for processing manure, it may also be used for any material where it is desired to remove the liquid from the solid, such as pulp in a lumber mill.

While the prior art auger of FIGS. 10-12 will operate full at all times, the auger of this invention may be gravity fed and will operate partially full.

The pressure gates at the end of the auger tubing will provide additional compacting of the material within the plug zone, but are not used as a primary means for regulating pressure within the auger system.

DESCRIPTION OF THE DRAWINGS

FIG. 1 is a fragmentary perspective view of the liquid and solid separator of this invention.

FIG. 2 is a cross-sectional view taken along Line 2—2 in FIG. 1.

FIG. 3 is a fragmentary perspective view of the modified conventional auger showing the added flattened flighting end portion.

FIG. 7 is a cross-sectional view similar to FIGS. 4–6 but showing the compressed material in the plug zone having opened the pressure gates for discharge of the material from the auger.

FIG. 8 is a cross-sectional view taken along Line 8—8 in FIG. 7.

FIG. 9 is an enlarged fragmentary view of the auger showing its opposite ends and three spacer elements on each end of the auger shaft.

FIG. 10 is a side elevational and cross-sectional view of a prior art auger separator with a single lower gate in a closed position.

FIG. 11 is a view similar to FIG. 10 of a prior art auger showing the pressure gate in an open position.

FIG. 12 is an end view of the auger of FIG. 11 taken along line 12—12 in FIG. 11.

DESCRIPTION OF THE PREFERRED EMBODIMENT

Figure 4:
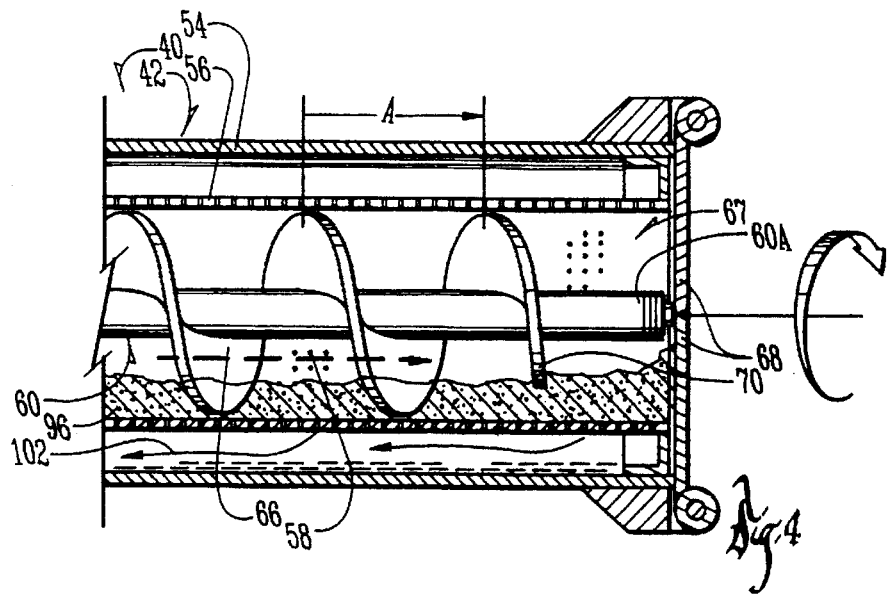
FIG. 4 is a cross-sectional view of the outlet portion similar to FIG. 2 but showing the area marked 4—4 in FIG. 2 enlarged in scale.

The liquid and solid separator of this invention is referred to generally in FIG. 1 by the reference numeral 40 and is seen to include an auger assembly 42 having an inlet end 44 and an outlet end 46. A hydrocyclone 48 is connected to the inlet end 44 of the auger assembly 42 and receives slurry material through an inlet 50 with liquid being discharged from an outlet tube 52.

It is understood that the separator 40 of this invention may be gravity fed in a conventional manner and that the use of the hydrocyclone is optional as a preliminary moisture removal step.

The auger assembly 42 includes an outer tube 54 seen in FIG. 2 and an inner tube 56 having perforations 58 which allow liquid to be drained from the inner tube 56 through an outlet tube 59.

An auger shaft 60 extends the length of the auger assembly 42 and is driven by a motor 62 through a chain drive 64. Primary flighting 66 extends along the auger shaft 60 from the inlet end 44 to adjacent the outlet end 46. A plug zone 67 is formed between the end of the flighting and a pair of pressure gates 68 normally closing the outlet end of the auger assembly 42.

Figure 5:
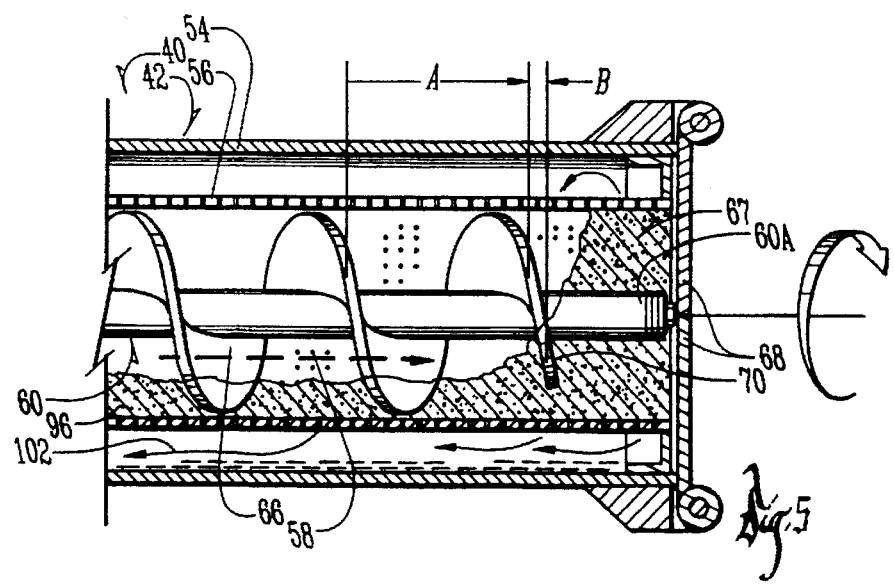
FIG. 5 is a cross-sectional view similar to FIG. 4 but showing the axial length of flighting added by the flattened end portion and solid material beginning to fill up the end zone of the auger around the stub shaft.
Figure 6:
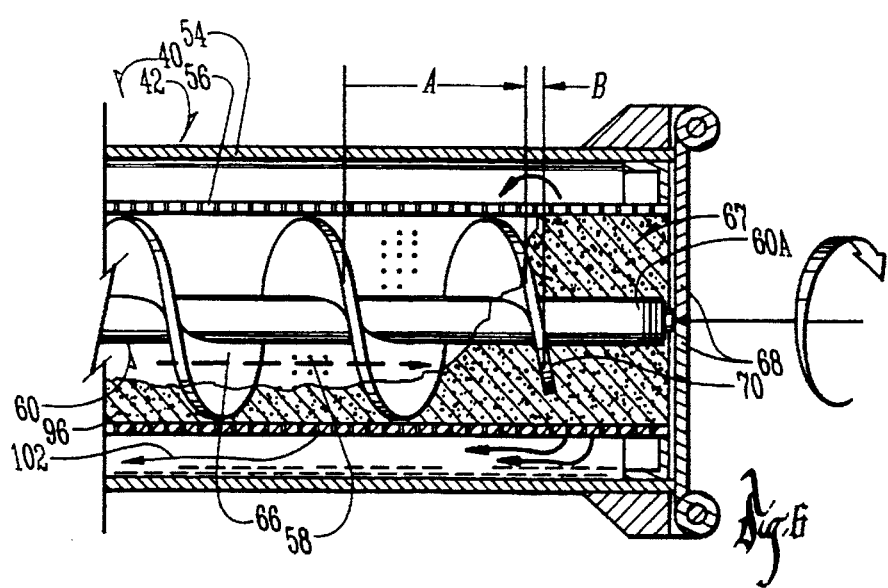
FIG. 6 is a cross-sectional view similar to FIGS. 4 and 5 but showing material having filled the end zone, creating a plug zone with bonded water being compressed from the material.

The primary flighting 66 is seen in FIG. 4 to have a constant pitch A that terminates in a flattened end portion 70 as seen in FIG. 3. As seen in FIG. 5, the flattened end portion 70 adds flighting of length B to the conventional flighting pitch A. The pitch A is for flighting extending 360° around the shaft 60 while the length of flighting B extends 70° to 80° around the shaft 60 for a distance B of ¼ to ⅜ inch. The flattened end portion flighting 70 will be less than fifty percent (180°) of a full pitch (360°), and as indicated preferably 70° to 80°. The precise axial length and circumferential length will vary with the material being processed through the auger assembly 42. It is seen that the pitch of the primary flighting 66 on the order of 9½ inches is reduced to ¼ to ⅜ inch, which is a reduction of pitch between 97.37% to 96.05%.

The auger shaft 60, as best seen in FIGS. 7 and 9, includes an outer end stub shaft portion 60A which extends from the flattened flighting 70 to the end of the perforated inner tube 56. The length of the stub shaft 60A in the plug zone 67 can be varied through the selective positioning of six spacers 80, three of which are shown in FIG. 9 on each end of the shaft 60. A bolt 82 having a washer 84 extends through three of the spacers 80 and is engaged by a nut 86 welded to the inside wall of the stub shaft 60A.

A drive shaft 88 at the inlet end 44 of the auger assembly 42 has multiple flattened surfaces 90 which matingly engage flattened surfaces 92 on the inside wall of the tube 60. The spacers 80 may be mounted on the drive shaft 88 between a bushing 94 and the left end of the auger shaft 60. It is seen that the more spacers 80 mounted on the stub shaft end 60A, the greater will be the length of the plug zone 67. Conversely, if the spacers 80 are mounted on the drive shaft 88 at the opposite end, then the plug zone will be shortened. The stub shaft 60A will at all times, however, extend to the outer end of the inner tube 56. While not shown, all six spacers 80 could be mounted on the stub shaft 60A to give it maximum length.

Thus, in operation, it is seen that manure 96 fed into the auger assembly 42 partially fills the inner tube 56 as seen in FIG. 7, but creates a plug zone 67 between the flattened flighting 70 and the end of the inner tube 56 around the stub shaft 60A. It is in this plug zone that the material 96 is compressed, causing the substantial amount of liquid to be removed as indicated by the arrows 100. The arrows 102 indicate the free water being removed from the material 96 as it moves the length of the auger assembly 42. The material 96 will eventually push open the oppositely disposed gates 68, which normally fully close the end of the inner tube 56. The amount of pressure required to open the gates 68 may be varied and thereby affect the pressure within the plug zone 67. It is understood, however, that the end gate 68 pressure is of secondary importance as compared to the pressure created by the flattened end portion flighting 70 which causes the material 96 to press against the perforated inner tube 56, and thereby squeeze out liquid 100. As previously noted, it is important that the stub shaft 60A extend all the way to the end of the inner tube 56 in order to keep the auger shaft 60 centered in the tube 56 and thereby avoid damage to the inner tube.

What is claimed is:

1. A liquid and solid separator comprising, an auger assembly having a perforated tube, having a constant diameter along its substantial length and including inlet and outlet ends, said perforated tube being perforated along its entire length and around its entire periphery, a shaft extending from the inlet end to the outlet end of said perforated tube and having a constant diameter along its substantial length, said shaft including primary flighting having a constant diameter along its substantial length, and said primary flighting terminating in spaced relation to the outlet end of said perforated tube including a flattened flighting end portion and forming a plug zone between said flattened flighting end portion and the end of said perforated tube, said flattened flighting end portion having a pitch substantially less than the pitch of the primary flighting for compacting material being conveyed in said auger assembly between said flattened flighting end portion and said perforated inner tube to separate liquids from the solids in said material.

2. The liquid and solid separator of claim 1 wherein said flattened flighting end portion extends less than 180° around said shaft.

3. The liquid and solid separator of claim 2 wherein said pitch of said flattened flighting end portion is less than 50% of the pitch of said primary flighting.

4. The liquid and solid separator of claim 2 wherein said flattened flighting end portion extends 70° to 80° around said shaft.

5. The liquid and solid separator of claim 4 wherein said pitch of said flattened flighting end portion is between ¼ to ⅜ inch in axial length.

6. The liquid and solid separator of claim 1 wherein said pitch of said flattened flighting end portion is less than 50% of the pitch of said primary flighting.

7. The liquid and solid separator of claim 1 wherein said pitch of said flattened flighting end portion is between ¼ to ⅜ inch in axial length.

8. The liquid and solid separator of claim 1 wherein said perforated tube is perforated along its entire length and circumference in said plug zone to allow liquid to be compressed from solid material and drained from said tube.

9. The liquid and solid separator of claim 8 wherein said tube is received in a second tube which includes a drain outlet for collecting and removing liquid from said auger assembly.

10. The liquid and solid separator of claim 9 and said tube includes pressure plates extending over the outlet end of said tube, said pressure plates being adjustable to open and close in response to varying pressures in said tube created by material being conveyed by said auger.

11. The liquid and solid separator of claim 1 and a hydrocyclone is positioned to feed material into said inlet end of said auger assembly for further separation of liquid and solid material.

12. The liquid and solid separator of claim 1 wherein said shaft in said plug zone forms a stub shaft portion unsupported except by material in the plug zone which functions as a support to center said primary flighting and shaft in said perforated tube.

13. The liquid and solid separator of claim 12 and spacer means is provided on said stub shaft portion to extend said stub shaft to the end of said perforated tube when said plug zone is lengthened by spacing said flattened flighting end portion further from the outer end of said perforated tube.

14. The liquid and solid separator of claim 13 wherein said spacer means includes said shaft having an outer open end and a bolt engaging a nut in the open end of said shaft with spacer elements being mounted on said bolt against the outer end of the shaft.

15. The liquid and solid separator of claim 13 wherein said shaft has inner and outer ends and includes spacer means on the inner end of said shaft such that when said length of said plug zone is reduced, said spacer means from the outer end of the shaft is moved to the inner end of the shaft, thereby consistently maintaining the length of said shaft such that it always extends to the outer end of said perforated tube.

16. A liquid and solid separator comprising, an auger assembly having a perforated tube including inlet and outlet ends, a shaft extending from the inlet end to the outlet end of said perforated tube, said shaft including primary flighting along its substantial length, and said primary flighting terminating in spaced relation to the outlet end of said perforated tube including a flattened flighting end portion and forming a plug zone between said flattened flighting end portion and the end of said perforated tube, said flattened flighting end portion having a pitch substantially less than the pitch of the primary flighting and extending less than 180° around said shaft for compacting material being conveyed in said auger assembly between said flattened flighting end portion and said perforated inner tube to separate liquids from the solids in said material.

17. A liquid and solid separator comprising, an auger assembly having a perforated tube including inlet and outlet ends, a shaft extending from the inlet end to the outlet end of said perforated tube, said shaft including primary flighting along its substantial length, said primary flighting terminating in spaced relation to the outlet end of said perforated tube including a flattened flighting end portion and forming a plug zone between said flattened flighting end portion and the end of said perforated tube, said flattened flighting end portion having a pitch substantially less than the pitch of the primary flighting for compacting material being conveyed in said auger assembly between said flattened flighting end portion and said perforated inner tube to separate liquids from the solids in said material, said perforated tube being perforated along its entire length and circumference in said plug zone to allow liquid to be compressed from solid material and drained from said tube, and said tube including pressure plates extending over the outlet end of said tube, said pressure plates being adjustable to open and close in response to varying pressures in said tube created by material being conveyed by said auger.

18. A liquid and solid separator comprising, an auger assembly having a perforated tube including inlet and outlet ends, a shaft extending from the inlet end to the outlet end of said perforated tube, said shaft including primary flighting along its substantial length, said primary flighting terminating in spaced relation to the outlet end of said perforated tube including a flattened flighting end portion and forming a plug zone between said flattened flighting end portion and the end of said perforated tube, said flattened flighting end portion having a pitch substantially less than the pitch of the primary flighting for compacting material being conveyed in said auger assembly between said flattened flighting end portion and said perforated inner tube to separate liquids from the solids in said material, said shaft in said plug zone forming a stub shaft portion unsupported except by material in the plug zone which functions as a support to center said primary flighting and shaft in said perforated tube, spacer means being provided on said stub shaft portion to extend said stub shaft to the end of said perforated tube when said plug zone is lengthened by spacing said flattened flighting end portion further from the outer end of said perforated tube, and said spacer means including said shaft having an outer open end and a bolt engaging a nut in the open end of said shaft with spacer elements being mounted on said bolt against the outer end of the shaft.

19. A liquid and solid separator comprising, an auger assembly having a perforated tube including inlet and outlet ends, a shaft extending from the inlet end to the outlet end of said perforated tube, said shaft including primary flighting along its substantial length, and said primary flighting terminating in spaced relation to the outlet end of said perforated tube including a flattened flighting end portion and forming a plug zone between said flattened flighting end portion and the end of said perforated tube, said flattened flighting end portion having a pitch substantially less than the pitch of the primary flighting for compacting material being conveyed in said auger assembly between said flattened flighting end portion and said perforated inner tube to separate liquids from the solids in said material, said shaft in said plug zone forming a stub shaft portion unsupported except by material in the plug zone which functions as a support to center said primary flighting and shaft in said perforated tube, spacer means being provided on said stub shaft portion to extend said stub shaft to the end of said perforated tube when said plug zone is lengthened by spacing said flattened flighting end portion further from the outer end of said perforated tube, and said shaft having inner and outer ends and including spacer means on the inner end of said shaft such that when said length of said plug zone is reduced, said spacer means from the outer end of the shaft is moved to the inner end of the shaft, thereby consistently maintaining the length of said shaft such that it always extends to the outer end of said perforated tube.

20. A liquid and solid separator comprising, an auger assembly having a perforated tube including inlet and outlet ends, a shaft extending from the inlet end to the outlet end of said perforated tube, said shaft including primary flighting along its substantial length, said primary flighting terminating in spaced relation to the outlet end of said perforated tube including a flattened flighting end portion and forming a plug zone between said flattened flighting end portion and the end of said perforated tube, said flattened flighting end portion having a pitch substantially less than the pitch of the primary flighting for compacting material being conveyed in said auger assembly between said flattened flighting end portion and said perforated inner tube to separate liquids from the solids in said material, and said shaft in said plug zone is substantially smaller in diameter than the diameter of said primary flighting and perforated tube and is free of any structure being secured thereto and forming a stub shaft portion unsupported except by material in the plug zone which functions as a support to center said primary flighting and shaft in said perforated tube.

21. A liquid and solid separator comprising, an auger assembly having a perforated tube including inlet and outlet ends, a shaft extending from the inlet end to the outlet end of said perforated tube, said shaft including primary flighting along its substantial length, and said primary flighting terminating in spaced relation to the outlet end of said perforated tube including a flattened flighting end portion and forming a plug zone between said flattened flighting end portion and the end of said perforated tube, said flattened flighting end portion having a pitch of at least 80% less than the pitch of the primary flighting for compacting material being conveyed in said auger assembly between said flattened flighting end portion and said perforated inner tube to separate liquids from the solids in said material.

* * * * *